Feb. 28, 1928.

J. E. GLEASON ET AL 1,660,502

METHOD AND APPARATUS FOR MAKING GEARS

Filed March 14, 1923   18 Sheets-Sheet 1

INVENTORS
James E. Gleason, George H. Bryan
Eyvind Finsen + Alton P. Slade
BY
Harold E. Stonebraker
their ATTORNEY

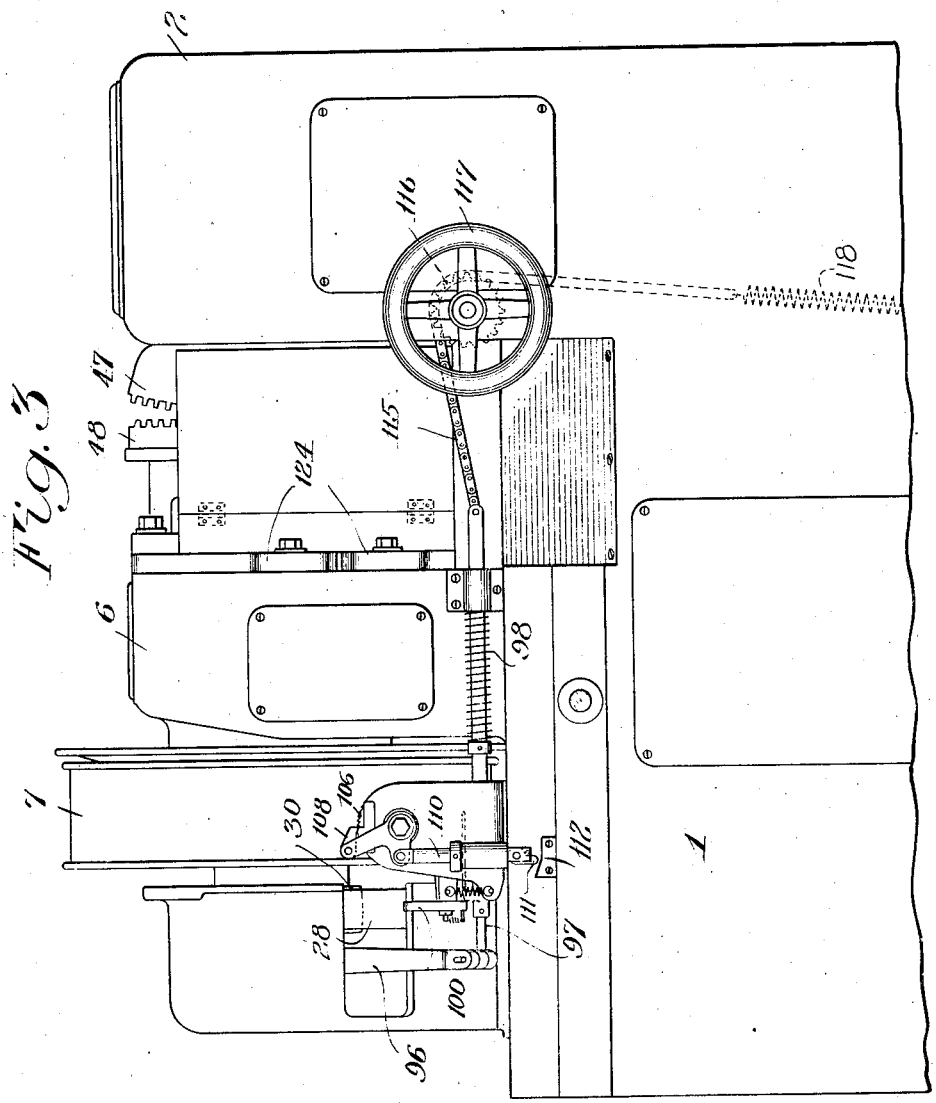

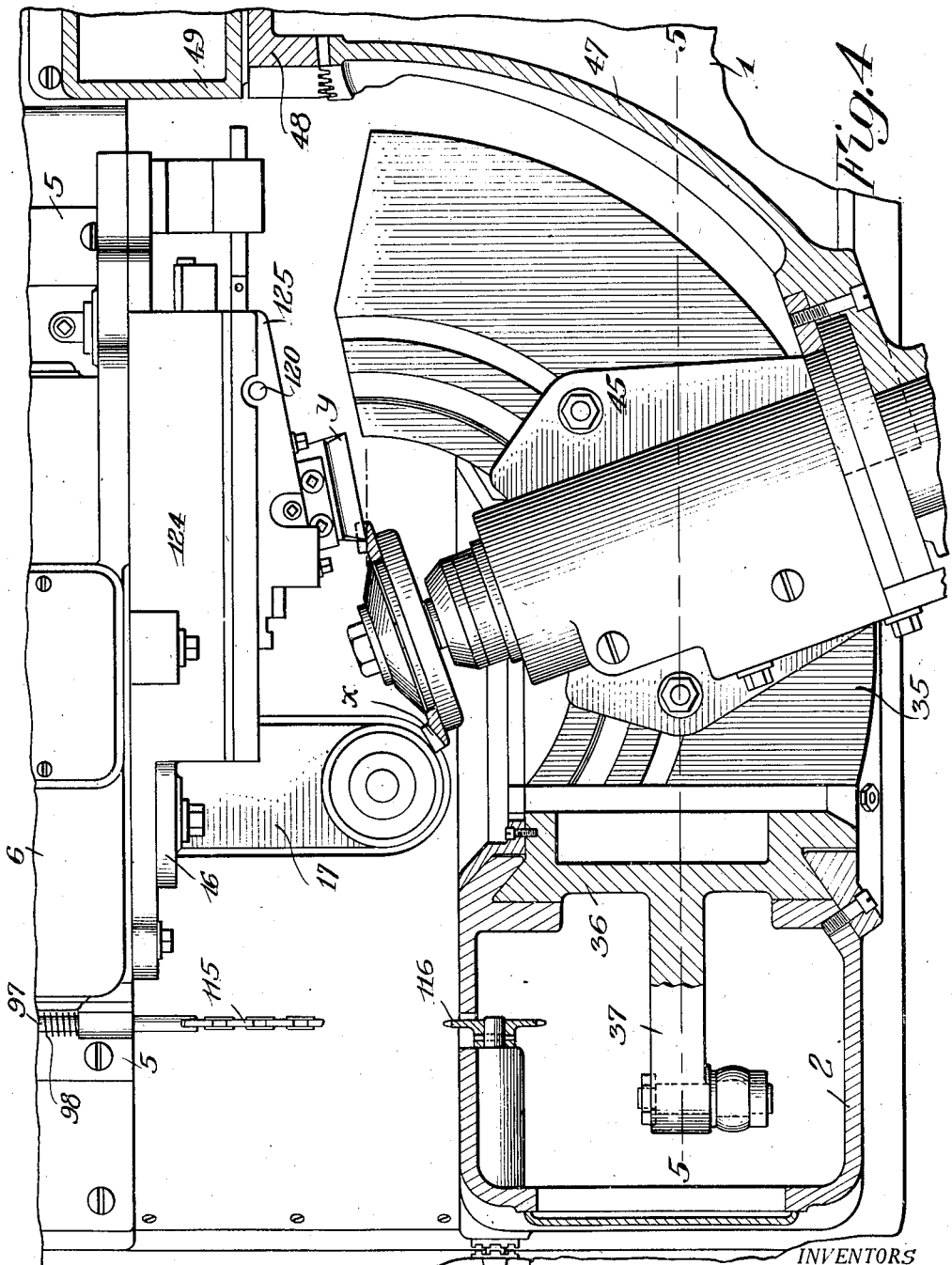

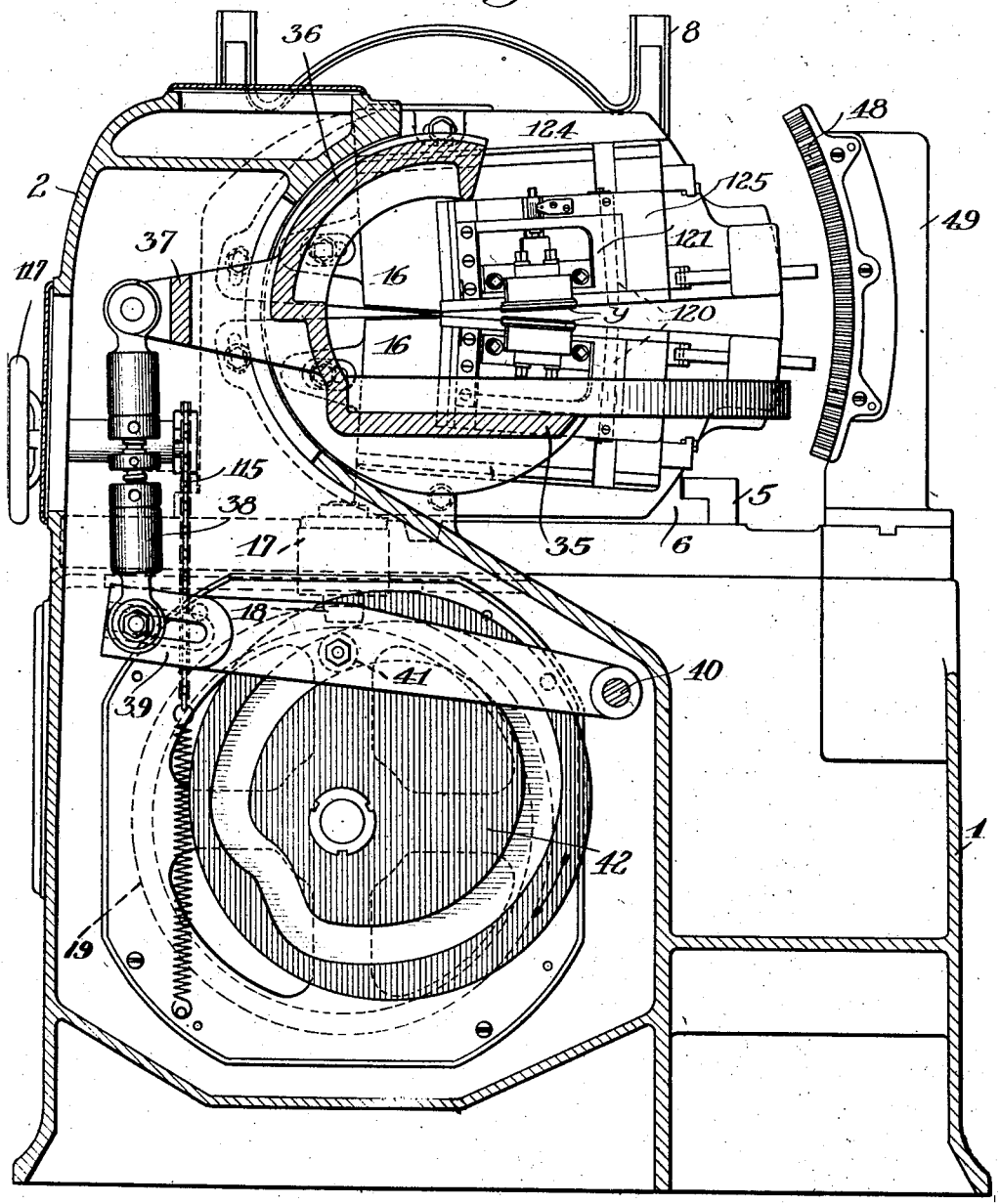

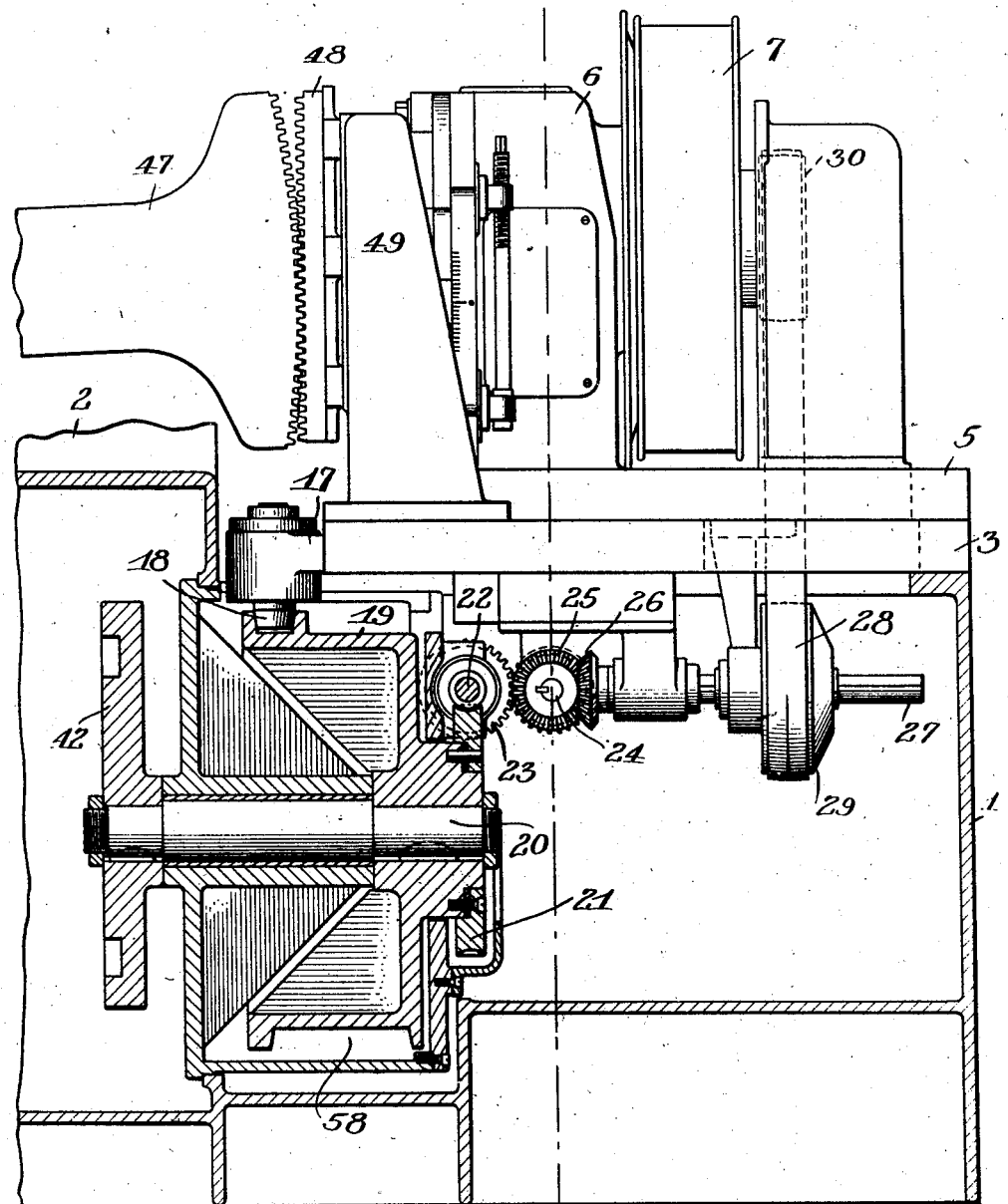

Feb. 28, 1928. 1,660,502
J. E. GLEASON ET AL
METHOD AND APPARATUS FOR MAKING GEARS
Filed March 14, 1923    18 Sheets-Sheet 7

INVENTORS
James E. Gleason, George H. Bryan,
Eyvind Finsen & Alton P. Slade
BY Harold E. Stonebraker
Their ATTORNEY

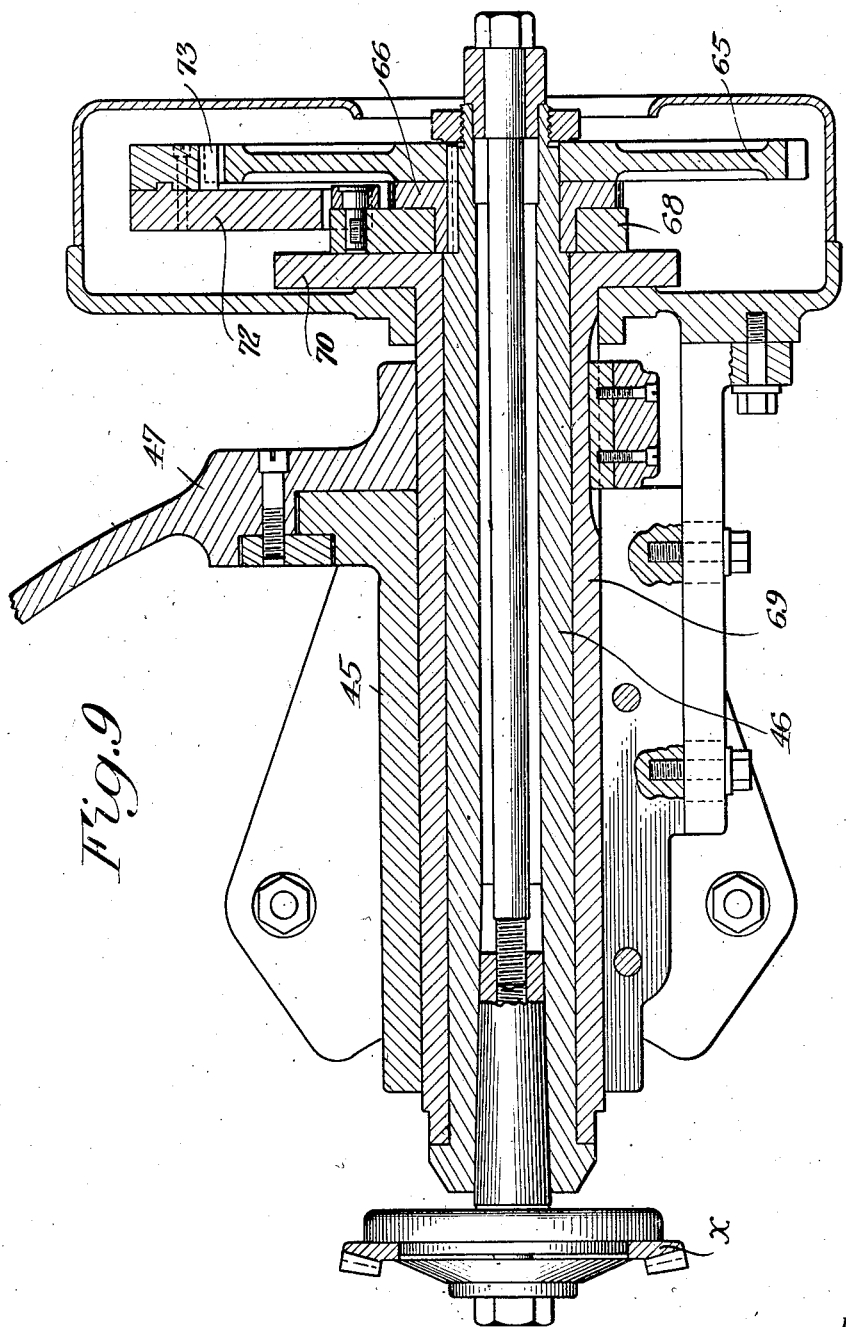

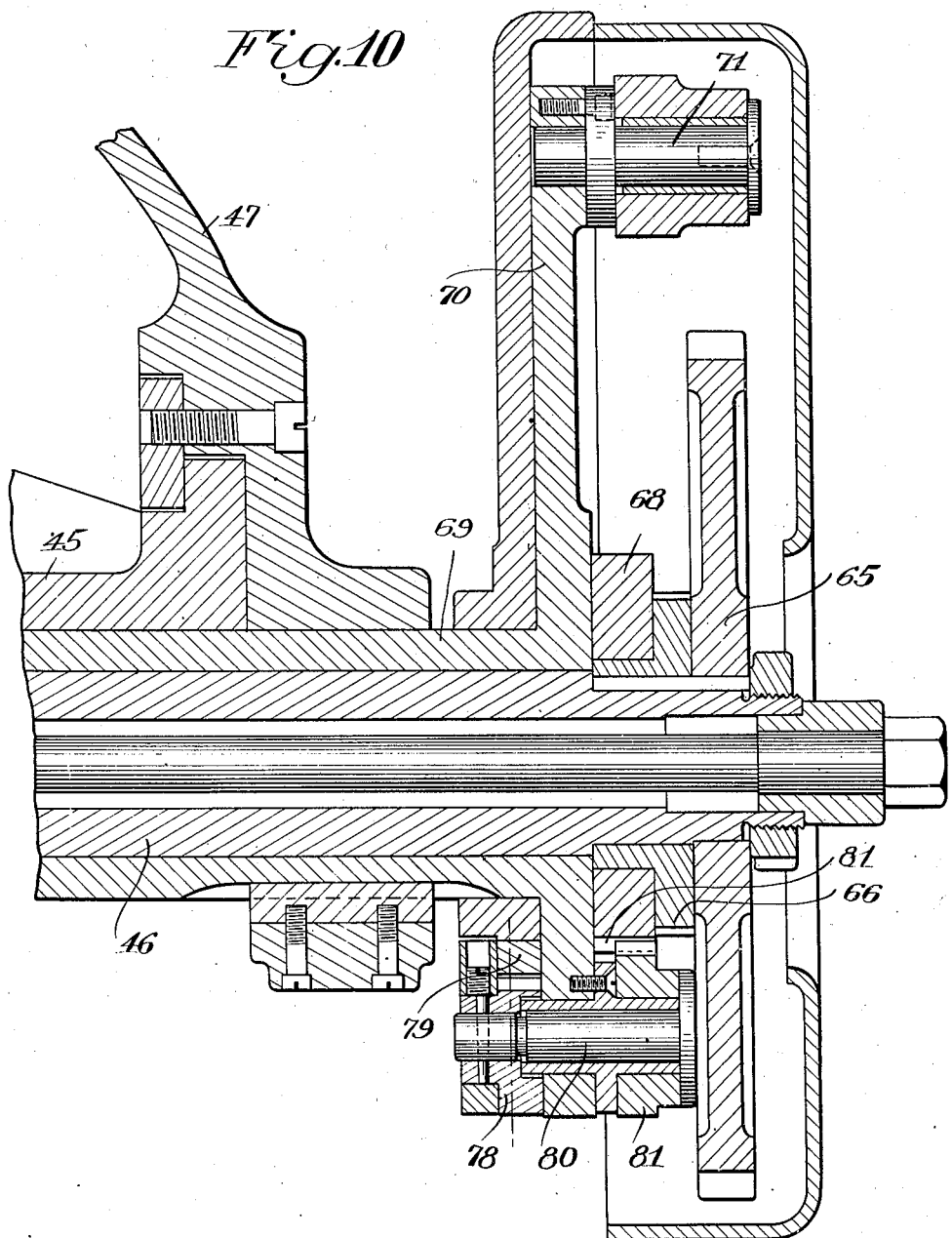

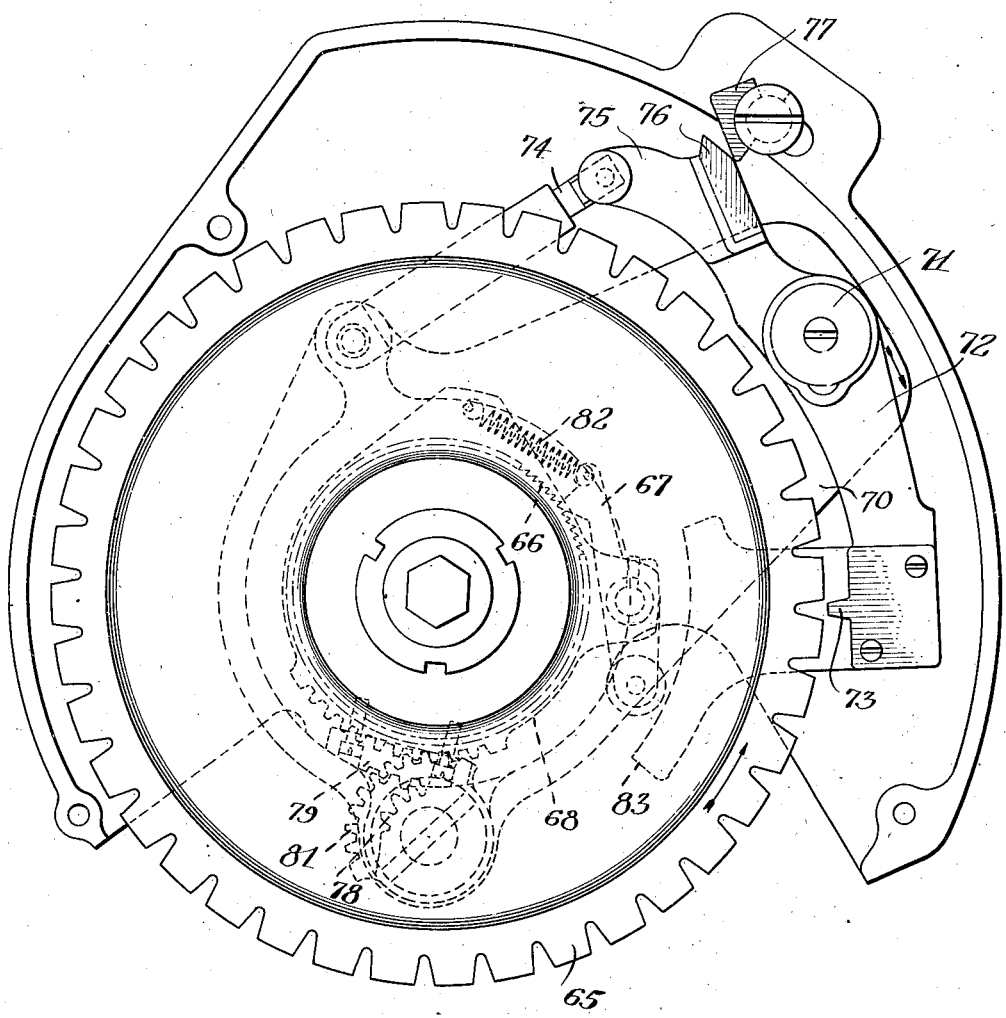

Feb. 28, 1928.  
J. E. GLEASON ET AL  
1,660,502  
METHOD AND APPARATUS FOR MAKING GEARS  
Filed March 14, 1923   18 Sheets-Sheet 13

INVENTORS  
James E. Gleason, George H. Bryan,  
Hynind Vinsen, Alton P. Slade  
by Harold R. Stonebrake  
their ATTORNEY Feb. 28, 1928. 1,660,502
J. E. GLEASON ET AL
METHOD AND APPARATUS FOR MAKING GEARS
Filed March 14, 1923 18 Sheets-Sheet 14
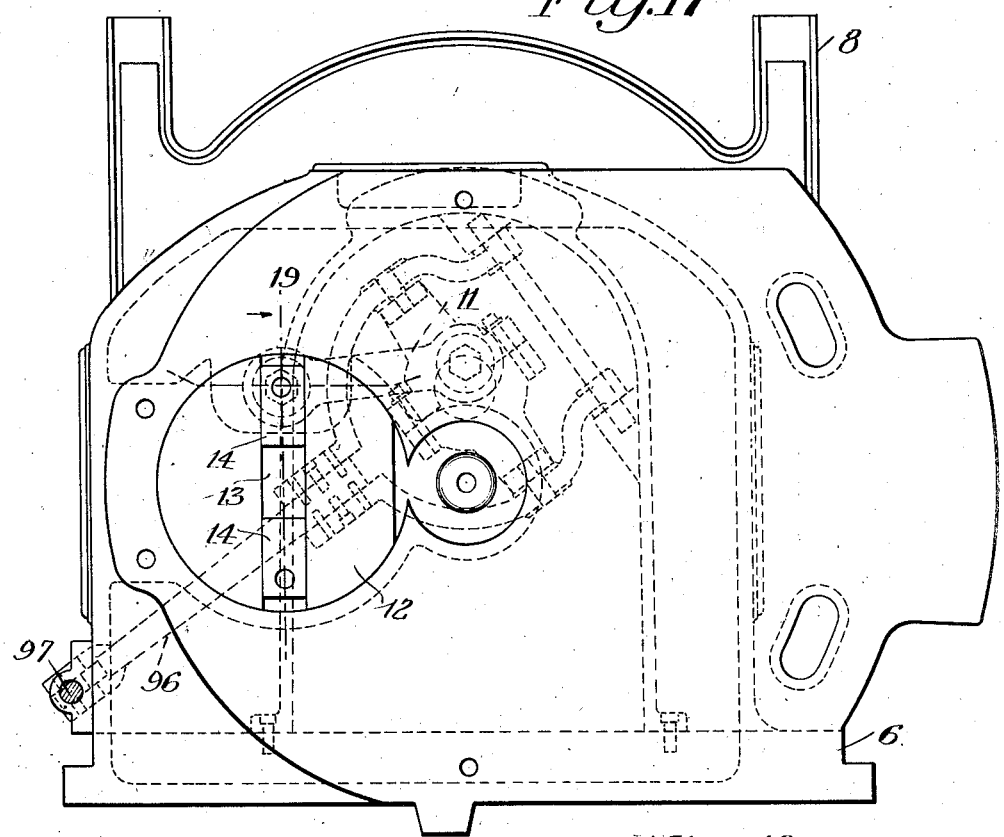
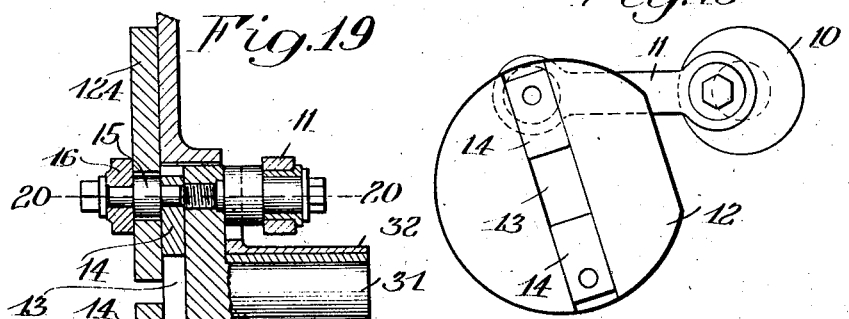
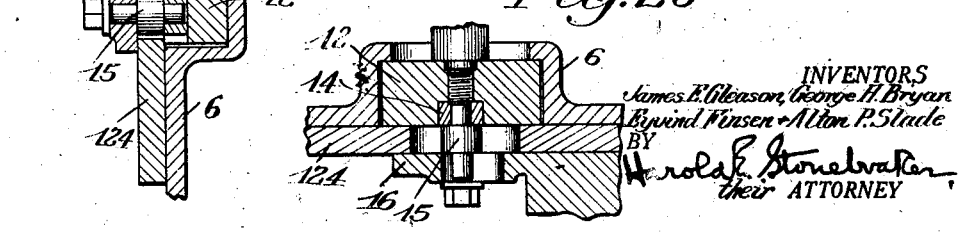

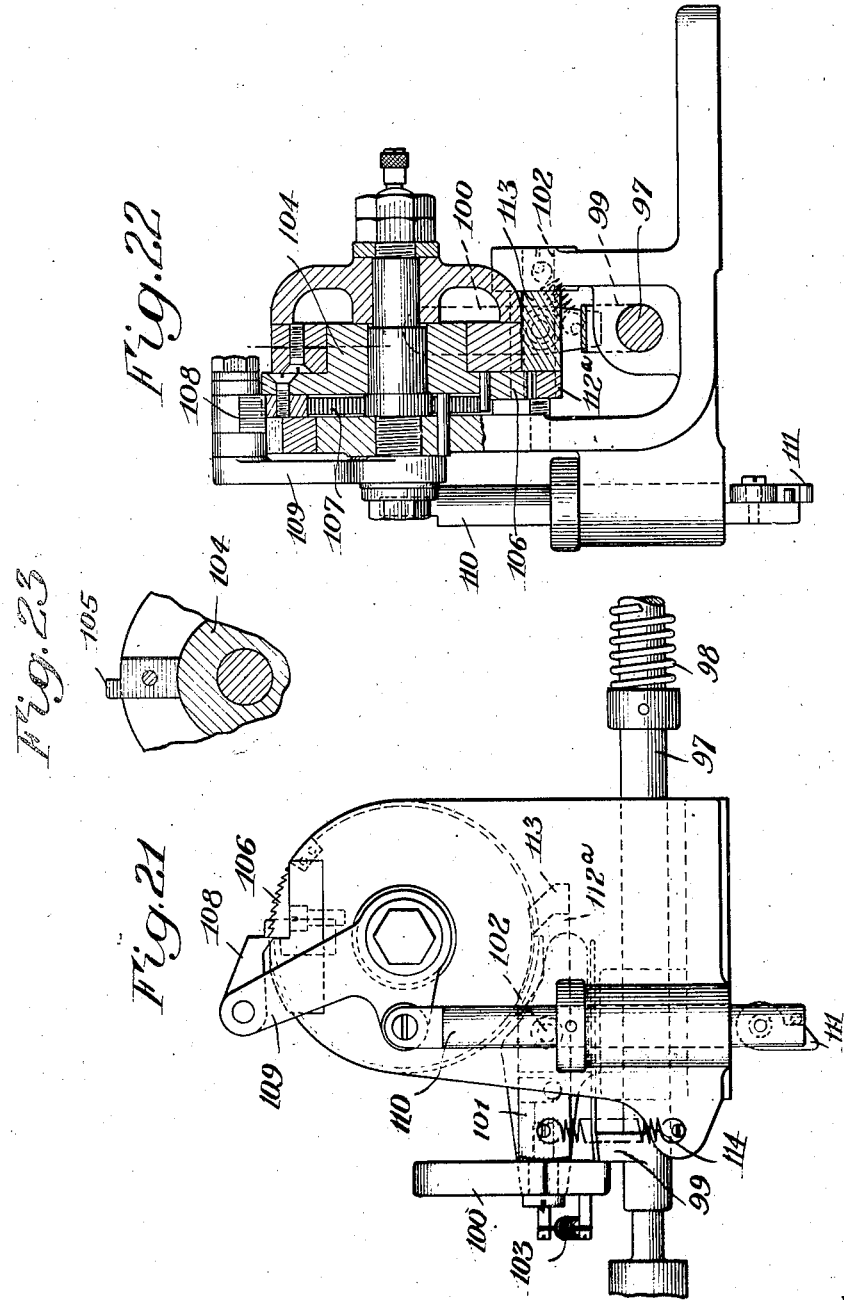

·OLD·FORM·

· NEW · FORM ·

Patented Feb. 28, 1928.

1,660,502

UNITED STATES PATENT OFFICE.

JAMES E. GLEASON, GEORGE H. BRYAN, EYVIND FINSEN, AND ALTON P. SLADE, OF ROCHESTER, NEW YORK, ASSIGNORS TO GLEASON WORKS, OF ROCHESTER, NEW YORK, A CORPORATION OF NEW YORK.

METHOD AND APPARATUS FOR MAKING GEARS.

Application filed March 14, 1923. Serial No. 624,962.

This invention relates to a method and machine for cutting gears, and in some aspects has to do more particularly with the production of straight-toothed bevel gears by what is known as a generating process, according to which a relative rolling motion is effected between a gear blank and a reciprocating tool, such as would be produced by rolling the pitch cone of the blank on a plane surface.

A principal purpose of the invention is to produce a machine that will give large-production, by enabling a very fast motion of a pair of alternately reciprocating tools. Incidental to this general purpose, it is a further object of the invention to provide a machine requiring a minimum of adjustable or movable parts, thereby increasing the ruggedness and durability of the mechanism under fast production operation.

Another purpose of the improvement is to provide a form of generating mechanism that insures giving the proper rolling motion to the gear blank to produce a theoretically correct tooth, while eliminating the necessity of adjusting the tool mechanism for gear blanks of different pitch angles; and instead of adjusting the tool mechanism according to the pitch angle of the blank, the blank is adjusted in each instance to a fixed line of travel of the tool, this result being obtained by mechanism that forms an accurate and theoretically correct tooth and which lends itself readily to large quantity production and fast cutting operations.

A further object of the invention is to afford a mechanical arrangement that insures a uniform and steady operation of the moving parts, avoiding any slight irregularities or jar which might otherwise be produced due to the rolling motion of the blank, or when stopping and starting the operation of the machine.

The invention also includes a number of meritorious features in the mechanism of the apparatus, as will appear from the following description, when read in conjunction with the accompanying drawing, the novel features being pointed out in the claims following the specification.

In the drawings:

Figure 3 is a side elevation;

Figure 4 is a horizontal sectional view taken centrally of the gear blank and showing a tool in cutting relationship;

Figure 5 is a vertical sectional view taken generally on the line 5—5 of Figure 4, with the gear blank support omitted, and showing the tool mechanism in elevation;

Figure 6 is a side elevation, illustrating the cam shaft and cooperating driving parts in vertical section;

Figure 9 is a longitudinal sectional view of the gear blank support and indexing mechanism;

Figure 10 is an enlarged sectional view similar to Figure 9, taken in a different plane;

Figure 12 is a similar view showing the parts after they have moved to release the index wheel and permit indexing;

Figure 17 is a side elevation of the support for the tool mechanism, with the tool slides and guides removed;

Figure 18 is a detail view in elevation of a portion of the operating mechanism for the tools;

Figure 19 is a sectional view on line 19—19 of Figure 17;

Figure 20 is a sectional view on line 20—20 of Figure 19;

Figure 21 is a side elevation of the automatic stop mechanism;

Figure 22 is a vertical sectional view of the parts illustrated in Figure 21;

Figure 23 is a detail sectional view of a portion of the automatic stop mechanism.

The principles and features of the invention may be adapted to various types of gear making machines, and the particular embodiment about to be described is intended only as an example of a practical embodiment of the invention. While this application discloses reciprocating tools of the planing type, the invention is equally applicable to gear making machinery involving other types of cutting mechanisms, such as milling cutters for making straight teeth, circular face milling cutters for making curved teeth, or similar grinding or abrasive elements for finishing gears by grinding instead of cutting, and where the term "tool" or "cutter" is employed in this application, it is intended to cover any cutting or grinding member that can be used to shape a gear tooth. The invention is also not restricted to bevel gears, as distinguished from other types of gears, or to generated gears, as distinguished from non-generated gears, except as to parts of the mechanism which are adapted only to the production of these particular types of gears.

The mechanism herein disclosed embodies generally a pair of alternately reciprocating planing tools mounted on a support, movable toward and from the gear blank at predetermined intervals to feed the tools to cutting position, and withdraw them therefrom after completion of each tooth. During the actual cutting operation, the tools have no motion other than their reciprocating travel, and the tooth profile is generated by imparting to the gear blank a bodily rolling motion over the tool, corresponding to rolling the blank on a crown gear, the teeth of which are represented by the cutting tools. To accomplish this motion, the gear blank is mounted on a support which is eccentrically arranged on a carrier, the latter having an oscillatory motion which imparts to the bodily roll to the blank, while the necessary turning of the blank about its own axis is produced by a gear segment fixed to the blank support and rolling on a second gear segment. By the term "eccentrically", as used in the preceding sentence and elsewhere in the following specification and claims in describing the relation of the gear blank support to the carrier, is meant that the rotary axis of the gear blank support and the rotary axis of the carrier do not coincide, although these axes do intersect.

In bevel gear generating machines heretofore using a gear segment for imparting generating motion to a gear blank, the segment has had the same pitch angle as the gear blank and was rolled on a crown gear, and the system of the present invention differs in that the rolling gear segment has a pitch angle slightly less than that of the blank, and instead of rolling on a crown gear rolls on a bevel gear segment having a pitch angle slightly less than ninety degrees.

Figure 1:
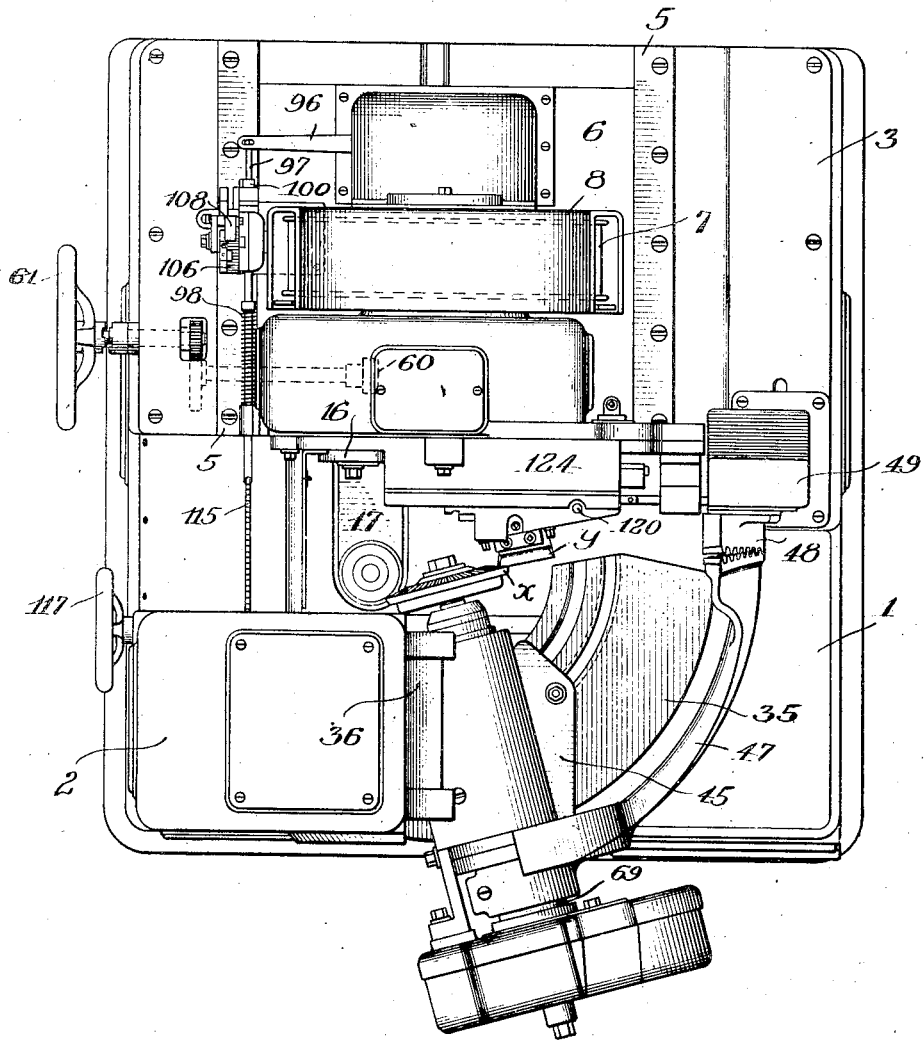
Figure 1 is a plan view of a machine embodying one practical adaptation of the invention.
Figure 2:
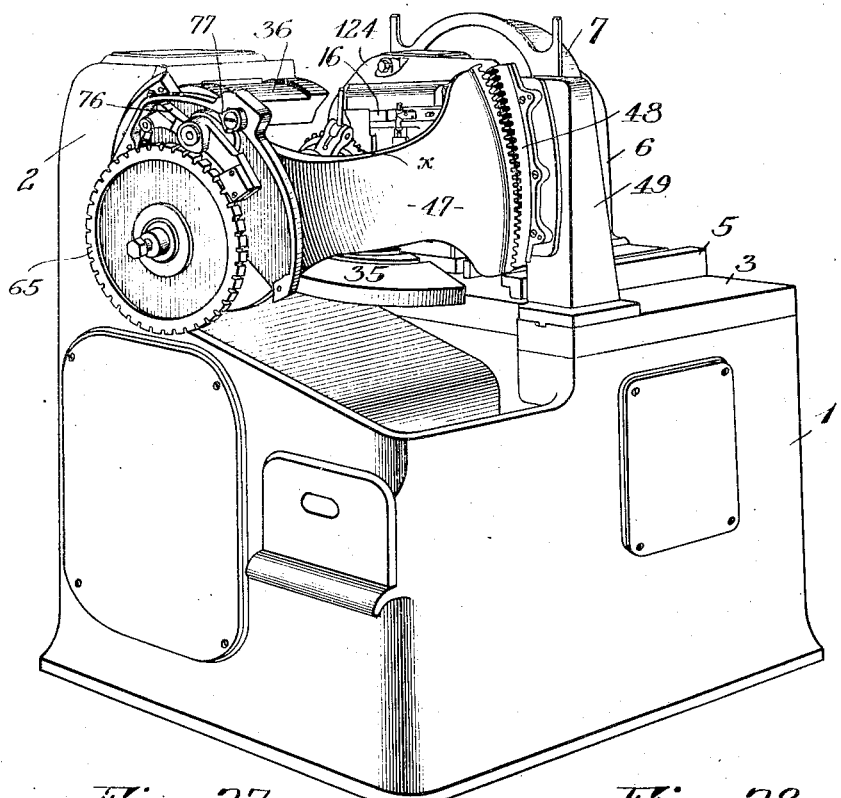
Figure 2 is a perspective view of the machine.

Referring to Figures 1 and 2, the structure includes a base 1 having an upright portion 2, in which oscillates the carrier on which the gear blank support is mounted, and 3 is a bed upon which the tool mechanism support is arranged and slidable back and forth for feeding. The following description will deal first with the tool mechanism, and its support mounted on the bed 3.

*Tool mechanism.*

Referring to Figures 1, 2 and 5 to 8, the bed 3 is provided with a pair of stationary tracks 5, which extend in a direction parallel to the axis about which the gear blank carrier oscillates for generation so as to cause a straight line feeding motion of the tool mechanism toward and from the blank and parallel to the center line of the machine, the tracks affording guideways for the tool mechanism support designated at 6.

The tool operating mechanism which is arranged on and movable with said support, includes a main power member or pulley 7, suitably journalled in a housing 8 and continuously driven from a belt or other suitable source of power. Journalled concentrically of the pulley 7 is a rotary spindle 9, see Figure 8, which is driven from the pulley 7 through a friction clutch mechanism that will be described presently. The spindle 9 is provided with a crank 10, see Figures 17 to 20, and 11 is a link connecting the crank 10 with an actuating plate 12 which has a slot 13 extending centrally across its face.

The actuating plate 12 is oscillated by the rotating spindle 9 and is operatively connected to the tool slides to cause the latter to reciprocate. To accomplish this, blocks 14 are employed which are slidably arranged in the slot 13 at opposite points thereof, and each block 14 is connected by a pin 15 with a tool slide 16 so that as the actuating plate 12 oscillates, it permits a compensating motion of the blocks 14 and produces an alternating reciprocating motion of the tool slides 16. The actuating plate 12 carries an integral arbor 31, see Figure 19, which is supported in a bearing sleeve 32.

Figure 7:
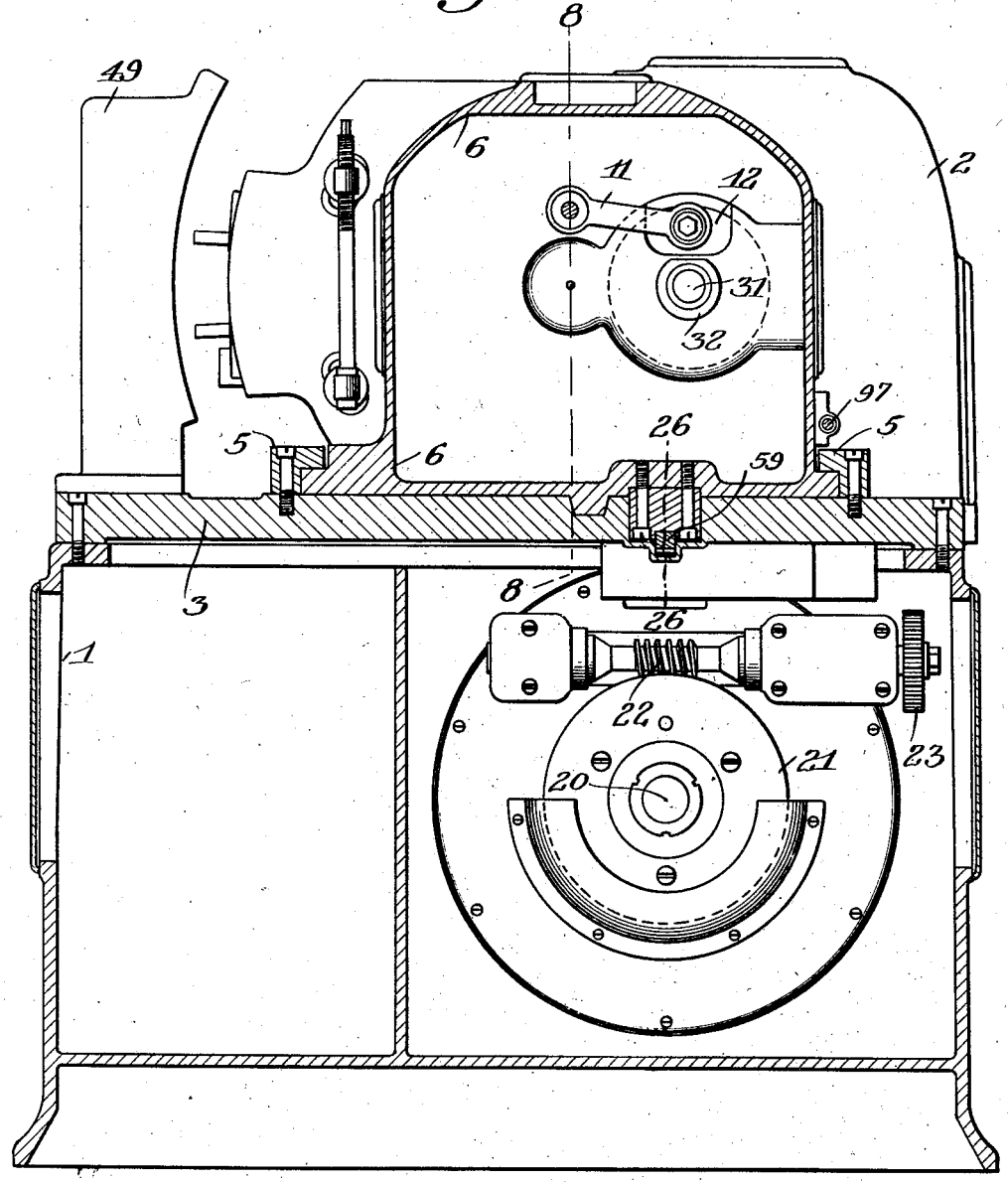
Figure 7 is a transverse vertical sectional view on line 7—7 of Figure 6.
Figure 26:
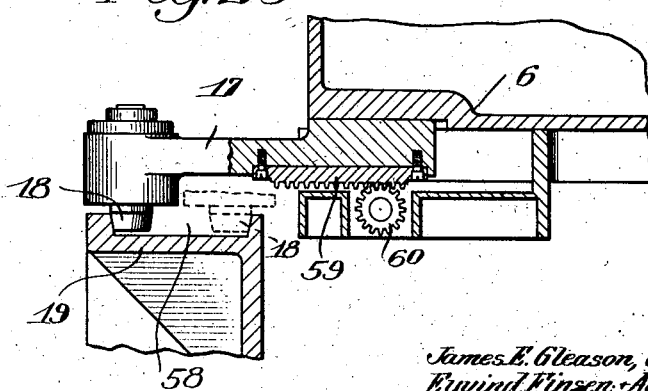
Figure 26 is a sectional view on line 26—26 of Figure 7.
Figure 11:
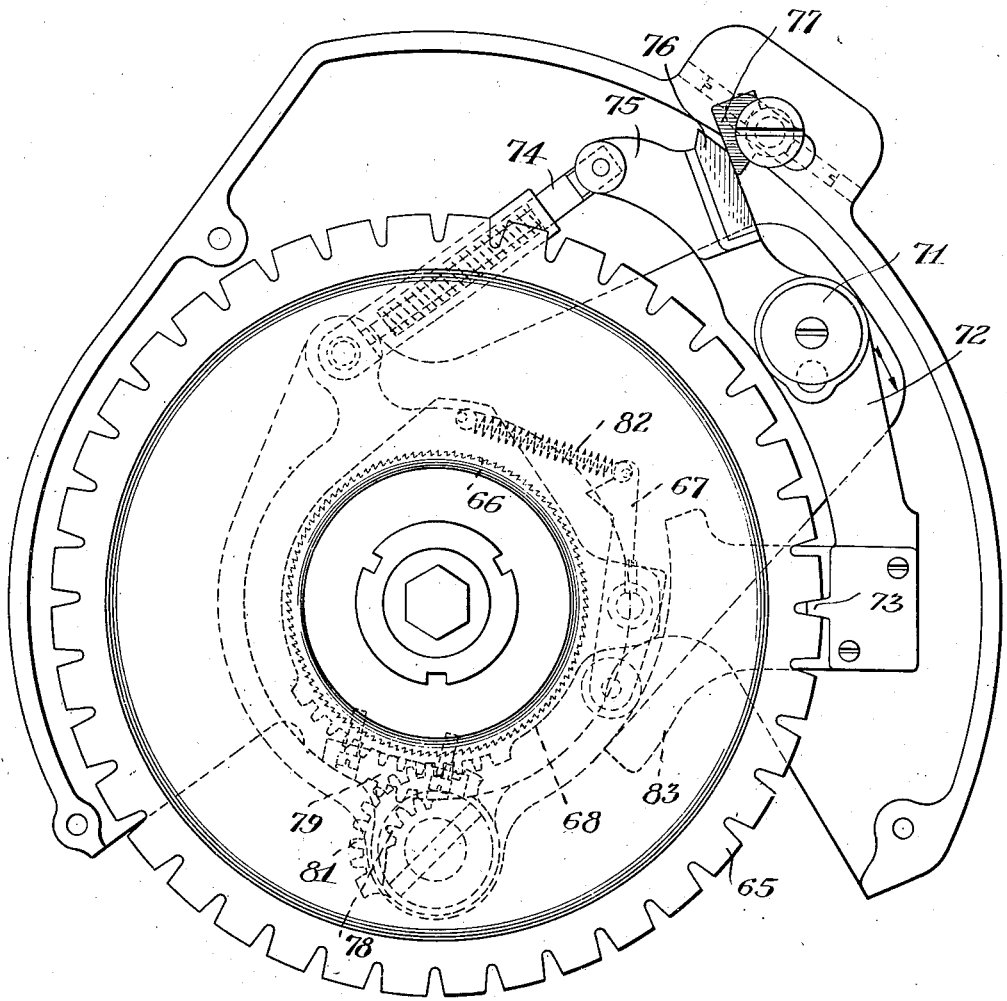
Figure 11 is an end elevation of the indexing mechanism, showing the position of the parts immediately previous to releasing the index wheel.
Figure 13:
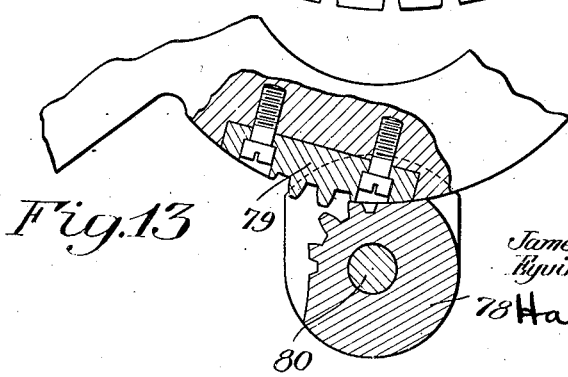
Figure 13 is an enlarged detail sectional view of a portion of the indexing mechanism.
Figure 14:
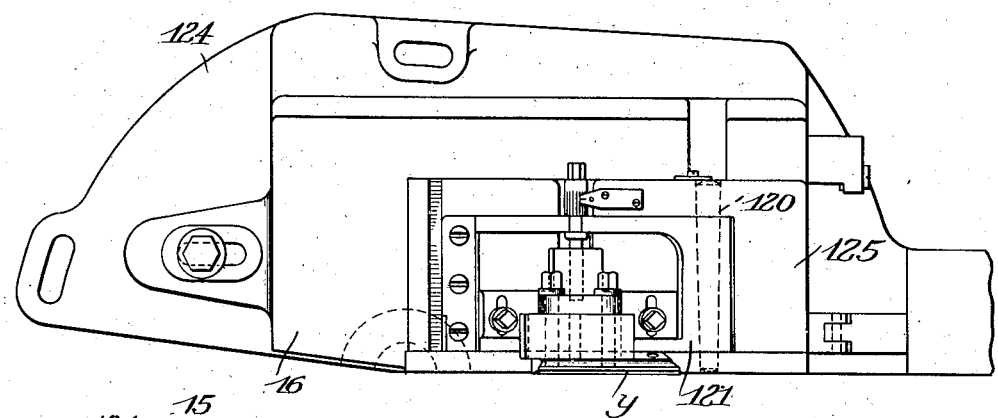
Figure 14 is a side view of one of the tool slides and its supporting guide.
Figure 15:
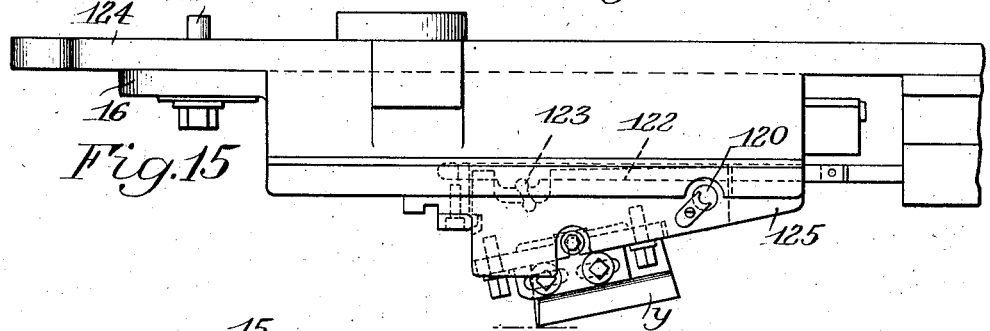
Figure 15 is a plan view of the same with the tool in cutting position.
Figure 16:
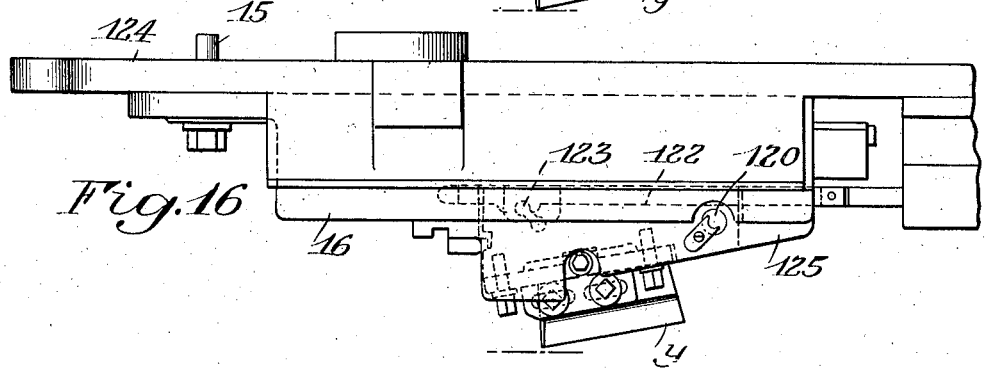
Figure 16 is a similar plan view showing the tool retracted on the return or non-cutting stroke of the tool slide.

To effect the necessary in-and-out feeding motion of the tool mechanism support, the latter has mounted thereon an arm 17, see Figure 26, carrying a pin 18 which engages and is controlled by the cam 19, see Figure 6. The cam 19 is keyed on a cam shaft 20, which carries a worm gear 21 driven by a worm 22. The worm 22, see Figures 6 and 7, is mounted on a spindle which carries at its outer end a pinion 23, the latter being driven by a pinion on shaft 24, see Figure 6. The shaft 24 carries a bevel gear 25 engaged and operated by a bevel gear 26 on a spindle 27 which is driven in any suitable manner from the main power member 7, as for instance by a belt 28 connecting a pulley 29 on spindle 27 with a transmission pulley 30, see Figures 6 and 8, forming part of the clutch mechanism.

The mechanism thus far described shows the means for reciprocating the tools during the cutting operation, also for feeding the tool mechanism support toward and from the gear blank between the forming of successive teeth, and the description immediately following will deal with the mechanism for supporting and imparting generating movement to the gear blank while the tools are reciprocating.

*Gear blank holding and generating mechanism.*

Referring to Figures 1, 2, 4 and 5, the aforementioned upright portion 2 is provided with circular guideways to receive a carrier, which includes a base or bed 35 for mounting the gear blank support and an upwardly extending curved portion 36 engaging said circular guideways. The carrier is provided with an arm 37, and 38 is a connecting member between the arm 37 and the free end of a lever 39, pivoted at 40, and carrying a pin 41 which engages and is controlled by the slot in the cam 42 to effect the necessary oscillatory movement of the carrier. The lever 39 is pivoted on one side of the cam while its free end is connected to the member 38 on the opposite side of the cam, and the pin 41 is arranged at a point between the ends of the lever, thereby affording a balanced and rugged arrangement which lends itself to a uniform and steady oscillatory movement of the carrier. The cam 42 is keyed on the cam shaft 20 already mentioned, see Figure 6.

Mounted on the bed or base 35 of the oscillatory carrier is a pedestal 45 within which is arranged the gear blank support comprising the sleeve 46, see Figures 9 and 10, to which the gear blank $x$ is secured by suitable means known in this class of machinery. The gear blank support 46 which is eccentric to the oscillatory axis of the carrier is fixedly connected, through indexing mechanism that will be described later, to a gear segment 47 which engages and rolls upon a gear member in the form of a bevel segment 48, see Figures 1, 2, 4 and 5, the segment 48 being preferably stationary upon a standard or post 49 mounted on the bed 3. By the mechanism just described, the gear blank is rolled past the tools by the oscillating carrier, and is rotated about its own axis through segments 47 and 48 a sufficient amount to impart to the blank a rolling motion as though it were rolling on a crown gear represented by the tools. The relationship of the generating segments, the principle of generation, and the method of positioning the gear blank and tools will now be described.

*Generating principle and method of adjusting blank to tools.*

Figure 29:
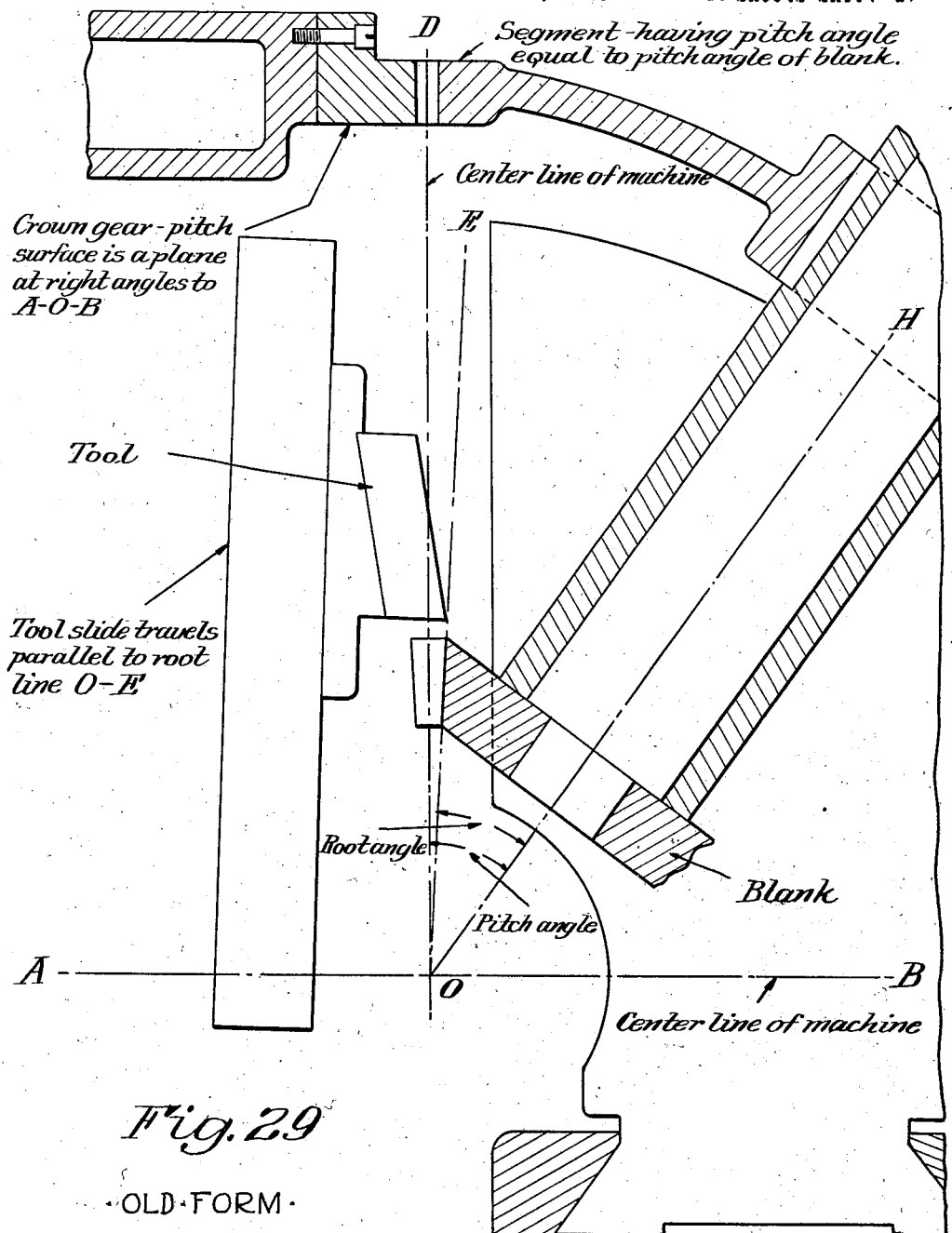
Figure 29 is a diagrammatic view illustrating a known theoretical method of imparting a generating motion to a gear blank, corresponding to rolling the pitch cone of the blank on a plane surface, by means of a segment rolling on a crown gear.
Figure 30:
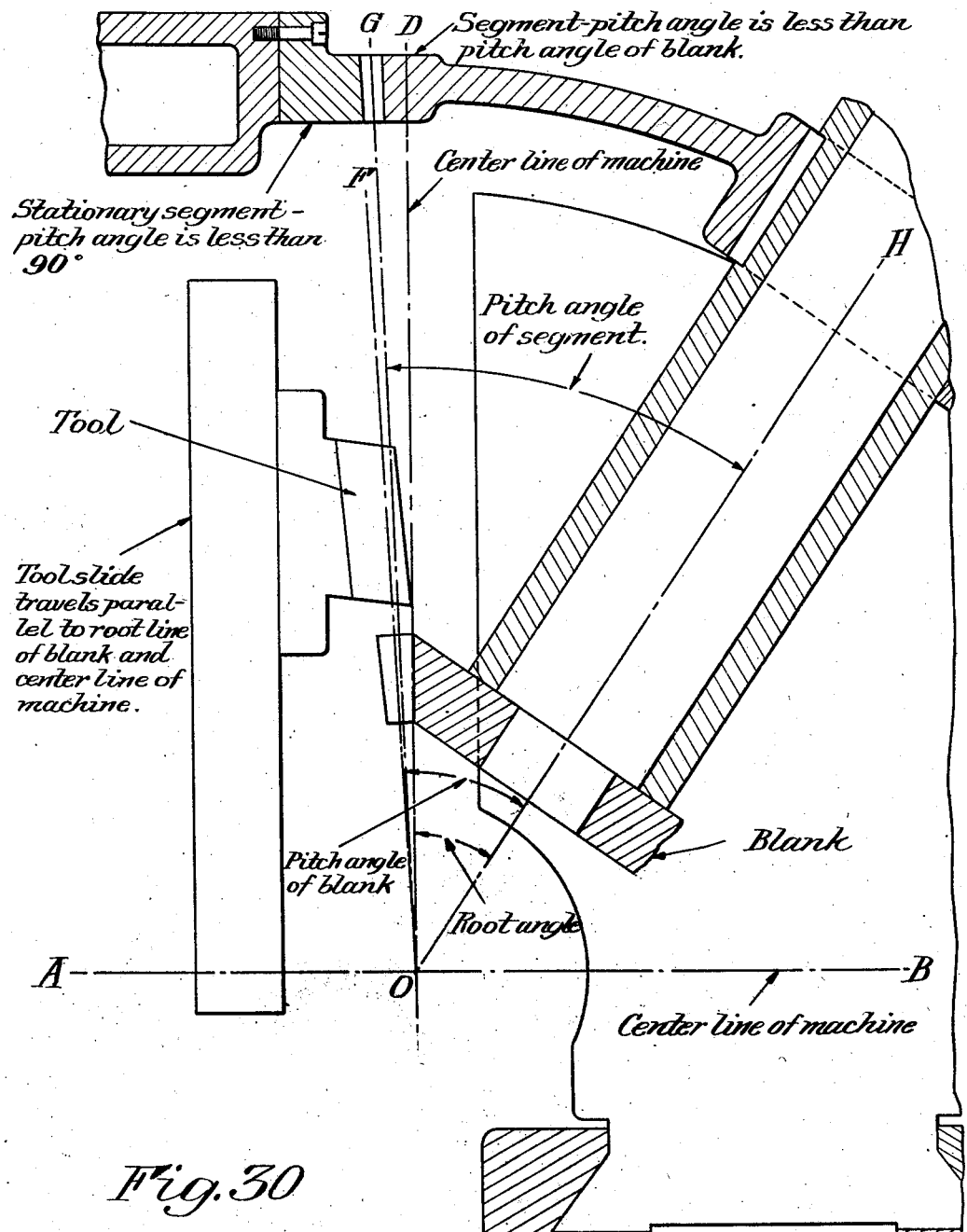
Figure 30 is a diagrammatic view illustrating the method of rolling the gear blank according to the present invention.

Figures 29 and 30 illustrate respectively the old form of generating principle, and the new form of generating principle incorporated in the method and apparatus forming part of this invention.

Referring to Figure 29, the practice has been to set the gear blank with its pitch line coinciding with the center line O D, and roll the blank by means of a bevel segment having a pitch angle the same as the blank and rolling on a crown gear having a pitch angle of ninety degrees with reference to the center line A O B. It will then necessary to adjust the tools to the root line of the tooth along which they would travel toward the center of the machine on the line E O, the line of travel of the tools being at an angle to the center line of the machine O D.

With the novel principle illustrated in Figure 30, the line of travel of the tool is fixed and no adjustment of the tool to the root line of the tooth is necessary. The tools always travel parallel to the center line of the machine O D, and the gear blank is adjusted in the first instance with its root line coinciding with the center line O D.

In Figure 29, the total angle between the axis A O B of the crown gear and the axis O H of the gear blank is ninety degrees plus the pitch angle of the blank, and in the arrangement illustrated in Figure 30, the corresponding angle is ninety degrees plus the root angle of the blank, since the blank is adjusted with its root line to the center, instead of its pitch line to the center line of the machine. In order to secure the proper rolling motion with the present system of Figure 30, instead of using a crown gear and segment, two bevel segments are employed, which produce for the given angle A O H the same ratio of roll as between the crown gear and segment of Figure 29. One segment has a pitch angle slightly less than that of the blank to be cut, and the other has a pitch angle slightly less than ninety degrees.

The pitch angles of these two segments are determined by a mathematical formula which forms no part of the present invention, it being sufficient to understand that the resultant roll of the gear blank with reference to the tools is the same, and produces a tooth profile the same, as though the rolling segment connected to the gear blank had a pitch angle the same as the gear blank and were rolling on a crown gear. Some advantages of this principle of generation are that no adjustment of the tools is necessary to aline them with the root line of the tooth to be cut; the generating segment, corresponding to the crown gear of the old system, can be stationarily mounted, and the setting up of the gear blank can be effected quickly and readily, all of which are important contributing factors to a more rugged and balanced mechanism, and correspondingly faster production.

Figure 27:
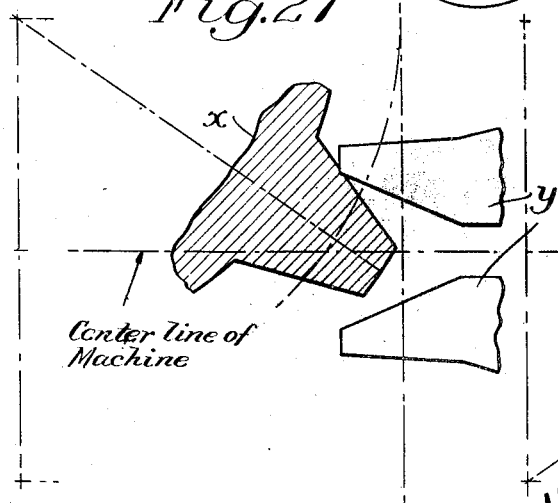
Figure 27 is a diagrammatic view illustrating the relation of the tools to a blank in the initial position previously to cutting.
Figure 28:
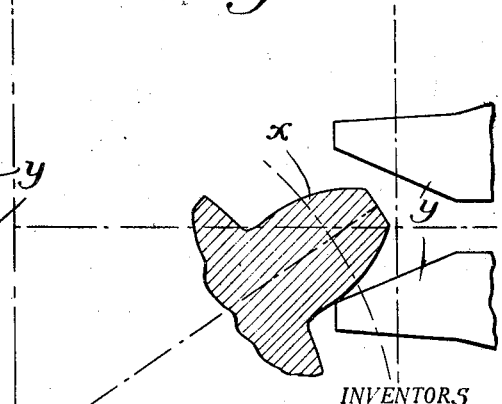
Figure 28 is a view similar to Figure 27, showing the shape and position of the tooth after the cutting operation is completed, and illustrating the profile produced by the generating motion.

Figures 27 and 28 illustrate the form of tooth profile produced. In Figure 27 is seen the tooth of a blank with the tools fed in and the blank commencing the down roll, while Figure 28 shows the blank axis at the bottom of the down roll, after both sides of a tooth have been shaped, and just previous to the up roll, during which the finishing cuts are taken.

*Generating and feeding cams.*

Figure 24:
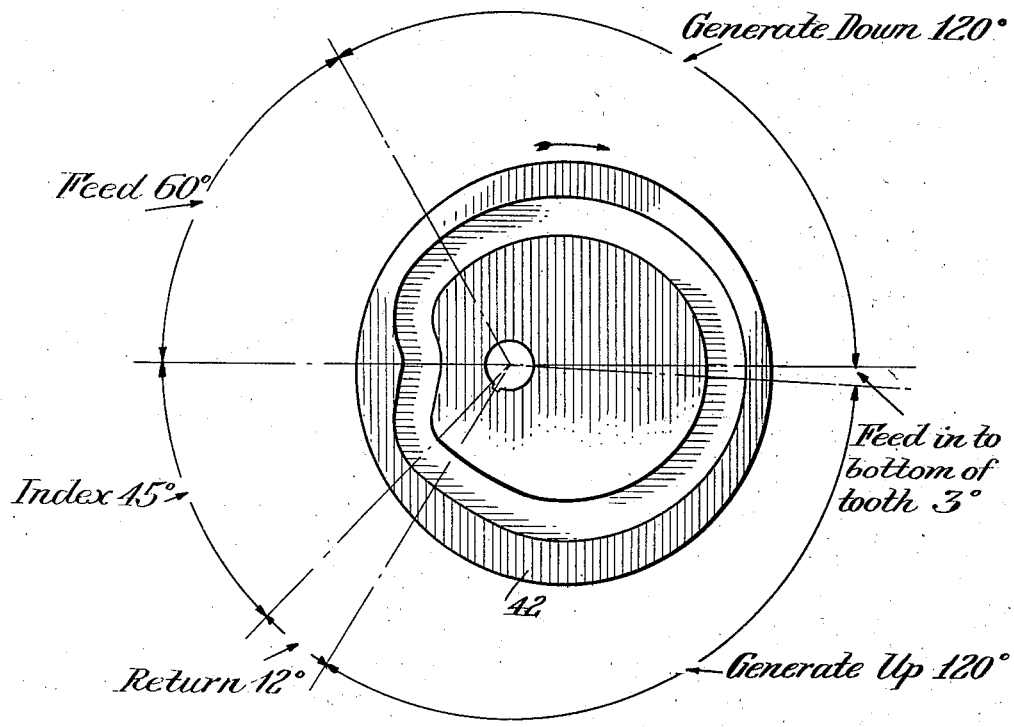
Figure 24 is a side elevation of the cam which controls the oscillatory movement of the carrier on which the gear blank support is mounted.

Referring to Figures 5 and 24, the tool mechanism support moves toward the blank when the blank axis is at its highest point, which occurs when the pin 41 is at its lowest point, or in the depression of the cam. As the gear blank starts to roll downwardly, the tools feed in and then cut until the blank axis reaches its lowest position of roll. At this point, the tool mechanism support automatically feeds in slightly further to effect a fine finished cut during the up-roll of the blank. When the cam has turned through three hundred and three degrees, the tool mechanism support is withdrawn to disengage the tools from the blank, and the latter is indexed through a distance of one tooth during the latter part of the up-roll of the blank.

Figure 25:
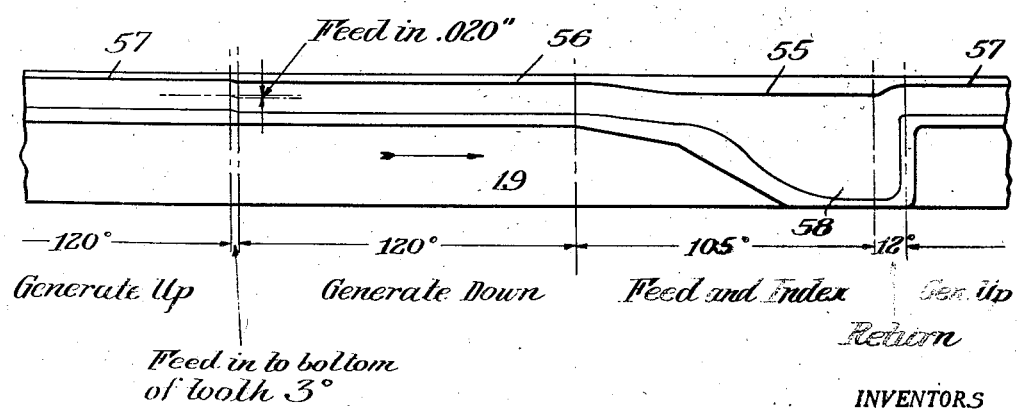
Figure 25 is a view illustrating the layout of the cam which controls the feeding motion of the tool mechanism support.

The cam which controls the feeding of the tool mechanism support is illustrated by the layout in Figure 25, in which the portion 55 holds the tool mechanism support retracted or away from the gear blank, the portion 56 feeds the tool mechanism support toward the gear blank for cutting during the down roll of the later, and the portion 57 feeds the tools still further toward the blank for a finishing cut during the up-roll of the blank. The recess 58 in the cam is to permit the tool mechanism support to be withdrawn manually for setting up a blank. This is accomplished by the mechanism illustrated in Figure 26, comprising a rack 59 carried by arm 17 and a pinion 60 engaging the rack and operated by a hand wheel 61, see Figure 1. When it is necessary to withdraw the tools for setting up a blank, the wheel 61 is turned manually, thereby moving rack 59 and the tool mechanism correspondingly.

*Indexing mechanism.*

Referring to Figures 9 to 12, the parts will now be described which bring about an indexing movement of the gear blank through a distance of one tooth while the tools are withdrawn. To accomplish this, the sleeve 46 has fixed thereon the usual index wheel 65 and also fixed on said sleeve 46 is a ratchet wheel 66 which is operated by a pawl 67 carried by collar 68. The bevel segment 47 is keyed to the sleeve 69 which carries the arm 70 having a pin 71 on which is mounted a lever 72. The front end of said lever 72 is provided with a dog 73 which engages the index wheel 65 and normally locks the generating segment and index wheel together. 74 is a spring plunger connected to the rear end 75 of the lever 72 and acting to retain the lever in its normal locking position and to return it to such position when released.

76 is a tail piece on said lever which engages a relatively stationary abutment 77 as the generating segment turns, thus depressing the rear end of said lever and moving the dog to the position shown in Figure 12, so that the index wheel is released. After the index wheel is released, as shown in Figure 12, further movement of the arm 70 causes a toothed segment 78 to engage the stationary teeth 79, see Figures 10 to 13, the gear segment 78 being mounted on arm 70 and carried by an arbor 80 which also carries a gear segment 81. The stationary toothed member 79 rocks the segment 78 and likewise the segment 81 which engages a series of teeth on the collar 68 thereby turning the latter. Turning of the collar 68, which carries the dog 67, rotates the gear blank support through a distance of one tooth, after which the return movement of the parts is effected, moving dog 73 into engagement with the index wheel again and retracting the pawl 67.

The latter is actuated toward the ratchet wheel 66 by means of the spring 82 and is held normally out of engagement therewith by an extension 83 on the lever 72, which engages the rear end of said pawl 67. The abutment 77 is pivoted for movement in one direction so as to permit the tail piece 76 to ride past it on the return stroke of the gear segment.

Automatic stop mechanism.

Figure 8:
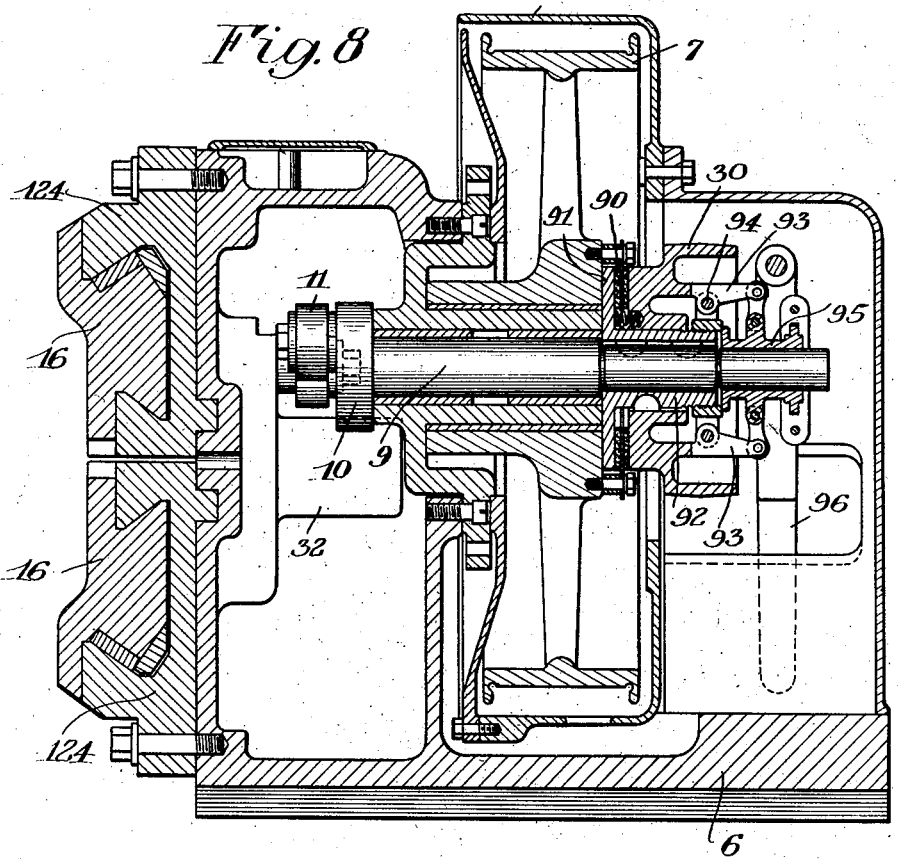
Figure 8 is a longitudinal vertical sectional view of the tool mechanism on line 8—8 of Figure 7.

As has heretofore been explained, the driving parts of the machine are brought into engagement with the power member 7 by moving the transmission pulley 30 longitudinally, thereby holding the friction clutch element 90, which is carried by pulley 7, see Figure 8, in driving engagement with the plate 91 carried by the collar 92 which is keyed to the spindle 9. The transmission pulley 30 is keyed to the collar 92 and is operated back and forth by bell cranks 93 pivoted at 94 and connected to a sliding sleeve 95. The sleeve 95 is operated back and forth by a pivoted lever 96, see Figure 3, which is connected to a plunger 97, and 98 is a spring acting to move the plunger 97 and lever 96 so as to release the clutch and stop the machine. Means are provided by which this disconnecting operation takes place at the completion of a gear, in the following manner.

The plunger 97 carries a lug 99, see Figures 3, 21 and 22, in the path of which lies an arm 100 which is carried on a plate 101, the latter being pivoted at 102. The arm 100 is pivoted on said plate 101 for a transverse swinging motion out of the path of lug 99, but is held normally in the path of said lug so as to hold the plunger retracted, by means of a spring 103. The plate 101 is controlled by an adjustable disk 104 which carries an abutment 105 that engages the plate 101 after a predetermined number of operations and thereby releases the plunger 97. In order to set the disk 104 for a predetermined number of tooth operations, it has connected thereto a ratchet wheel 106, while 107 is a coil spring which acts to return the disk 104 and ratchet wheel 106 to normal position. 108 is a pawl carried by the bell crank 109 which is operated by a vertical plunger 110, the latter having a pivoted pawl 111 at the bottom thereof arranged in the path of a stationary abutment 112, see Figure 3. In operation, the ratchet wheel 106 is adjusted in accordance with the number of teeth to be cut on the blank, and at each feeding operation of the tool mechanism support, the plunger 110 is operated upwardly and the pawl 108 moves the ratchet wheel 106 around one notch, said ratchet wheel being held in such position by a spring actuated locking pawl 112$^a$. When the ratchet wheel has been actuated around sufficiently to bring the abutment 105 against the end portion 113 on the plate 101, said plate 101 is rocked on the pivot 102 against the action of spring 114, and the arm 100 is lifted out of engagement with the lug 99, releasing the plunger 97. When it is desired to free the plunger 97 from the arm 100, in setting up operations, the arm 100 can be rocked manually on its axis against the tension of the spring 103, which returns it to normal position. In order to set the clutch in starting the machine, there is provided a sprocket chain 115 connected to plunger 97, and engaging a sprocket wheel 116, on a spindle having a hand wheel 117, see Figure 3. By turning hand wheel 117, the chain 115 and plunger 97 are retracted so as to operate the clutch and permit arm 100 to engage lug 99 and lock the plunger with the clutch engaged. The spring 118 is connected to the end of chain 115 to maintain the latter in engagement with sprocket wheel 116.

Tool supporting devices.

Referring to Figures 8 and 14 to 16, each tool slide 16 has an integral housing within which is mounted on a vertical pivot 120 a tool box 121. The tool box is movable in and out from the cutting position shown in Figure 15 to the non-cutting position shown in Figure 16, which latter position is occupied during the return stroke of the tool slide. To accomplish this, the tool box is connected with a controlling rod 122 by a link 123 which has a universal connection with the controlling rod and tool box. On the return stroke of the tool, the controlling rod 122, which slides in a friction clamp, is given a slight longitudinal movement with reference to the tool slide, as usual in this class of mechanism, and the link 123 is thereby moved to the position shown in Figure 16, to retract the tool box. The tool $y$ is mounted by suitable adjusting devices in the tool box 121, which is pivotally mounted directly upon the tool slide 16, the latter having reciprocating motion as already described in stationary guides or arms 124, which are adjustable in accordance with the taper of tooth to be produced on the particular blank.

While the invention has been described with reference to certain mechanical details and improvements, it is not limited to the particular embodiment set forth, and this application is intended to cover any modifications or changes embodying the novel principles herein disclosed, or any novel mechanical features or combinations herein set forth, or coming within the terms or intended scope of the following claims.

We claim:

1. The method of generating a bevel gear which consists in fixedly connecting to a blank a bevel gear segment having a pitch angle less than that of the blank to be cut, said segment and blank being arranged on the same side of the cone center of the blank, rolling said segment on a second bevel gear segment having a pitch angle less than ninety degrees, and operating a tool through said blank during such rolling motion.

2. The method of generating a bevel gear which consists in adjusting a blank with the root line of a tooth parallel to the line of travel of a tool, fixedly connecting to the blank a bevel gear segment having a pitch angle less than that of the blank to be cut, said segment and blank being arranged on the same side of the cone center of the blank, rolling the segment on a second bevel gear segment having a pitch angle less than ninety degrees whereby to obtain a rolling of the blank as of its pitch cone surface rolling on a plane, and operating a tool through the blank during such rolling motion.

3. The method of generating a bevel gear which consists in rolling a blank by fixedly connecting to the blank a bevel gear segment having a pitch angle less than that of the blank to be cut, said segment and blank being arranged on the same side of the cone center of the blank, rolling said segment on a stationary bevel segment having a pitch angle less than ninety degrees, and operating a cutter through the blank during such rolling motion of the blank.

4. The method of generating a bevel gear which consists in reciprocating a planing tool in a straight path and rolling the blank past the tool by means of a bevel gear segment fixedly connected to the blank and rolling on a stationary bevel gear segment having a pitch angle other than 90°, said segments and blank being arranged on the same side of the cone center of the blank.

5. The method of generating a bevel gear which consists in reciprocating a planing tool in a straight path and securing a relative motion between the blank and tool as of the pitch cone of the blank rolling on a plane surface, by means of a pair of relatively rolling bevel gear segments having pitch angles other than 90°, said segments and blank being arranged on the same side of the cone center of the blank.

6. The method of generating a bevel gear which consists in reciprocating a planing tool in a straight path and rolling the pitch cone of the blank on an imaginary plane surface with reference to the tool by means of a bevel gear segment fixedly connected to the blank and rolling on a second bevel gear segment having a pitch angle other than 90°, said segments and blank being arranged on the same side of the cone center of the blank.

7. The method of generating a bevel gear which consists in reciprocating a planing tool in a straight path, adjusting the root line of a tooth parallel to the line of travel of the tool, and effecting a rolling action of the blank with relation to the tool as of its pitch cone surface rolling upon a plane, by means of a bevel gear segment fixedly connected to the blank and rolling upon a stationary bevel gear segment having a pitch angle other than 90°, said segments and blank being arranged on the same side of the cone center of the blank.

8. The method of generating a bevel gear which consists in moving a tool in a straight path, and rolling a blank past the tool by fixedly connecting to the gear blank a bevel gear segment having a pitch angle less than that of the blank, said segment and blank being arranged on the same side of the cone center of the blank, and rolling said segment on a second bevel gear segment having a pitch angle less than ninety degrees.

9. The method of generating a bevel gear which consists in moving a tool in a straight path, adjusting a blank with the root line of a tooth parallel to the line of travel of the tool, fixedly connecting to the blank a bevel gear segment having a pitch angle less than that of the blank, said segment and blank being arranged on the same side of the cone center of the blank, and rolling the segment on a second bevel gear segment having a pitch angle less than ninety degrees whereby to obtain a rolling of the blank relatively to the tool as of its pitch cone surface rolling on a plane.

10. The method of generating a bevel gear which consists in moving a tool in a straight path, and rolling the blank past the tool by fixedly connecting to the blank a bevel gear segment having a pitch angle less than that of the blank to be cut, said segment and blank being arranged on the same side of the cone center of the blank, and rolling said segment on a second bevel segment having a pitch angle less than ninety degrees.

11. A bevel gear generating machine comprising a tool adapted to travel always along the center line of the machine, a bevel gear segment which is fixedly connected to a gear blank on the same side of the cone center as the gear blank, and a second bevel gear segment on which the first segment rolls, the root line of the blank being adjusted to coincide with the center line of the machine, whereby to impart to the blank a rolling motion as of its pitch cone surface on a plane with reference to the tool.

12. A bevel gear generating machine comprising a tool traveling always along the center line of the machine, the blank being adjusted with its root line parallel to the line of travel of the tool, and instrumentalities for effecting a rolling motion of the blank relatively to the tool as of its pitch cone surface on a plane, by means of a pair of relatively rolling bevel gear segments, said segments and blank being arranged on the same side of the cone center of the blank.

13. A bevel gear generating machine comprising a tool, a bevel gear segment fixedly connected to a gear blank and having a pitch angle less than that of the gear blank, said segment and blank being arranged on the same side of the cone center of the blank, and a second bevel gear segment having a pitch angle less than ninety degrees and cooperating with the first mentioned segment as the latter rolls thereon.

14. A bevel gear generating machine comprising a tool, means permitting adjusting a gear blank with the root line of a tooth parallel to the line of travel of the tool, a bevel gear segment having a pitch angle less than that of the blank and fixedly connected thereto, said segment and blank being arranged on the same side of the cone center of the blank, a second bevel gear segment which is stationary and has a pitch angle less than ninety degrees, and instrumentalities for rolling the first mentioned segment on the latter segment thereby effecting a rolling motion of the blank as of its pitch cone surface on a plane with reference to the tool.

15. A bevel gear generating machine comprising a tool, a bevel gear segment fixedly connected to a gear blank and having a pitch angle less than that of the blank, said segment and blank being arranged on the same side of the cone center of the blank, a stationary bevel gear segment having a pitch angle less than ninety degrees, and means for rolling the first mentioned segment on the latter segment.

16. A bevel gear generating machine comprising a reciprocating tool, a bevel gear segment fixedly connected to a gear blank and having a pitch angle less than that of the blank, said segment and blank being arranged on the same side of the cone center of the blank, a bevel gear member having a pitch angle less than ninety degrees, and means for rolling the first mentioned segment on said gear member.

17. A bevel gear generating machine comprising a reciprocating tool, means permitting adjusting a gear blank with the root line of a tooth parallel to the line of travel of the tool, a bevel gear segment having a pitch angle less than that of the blank and fixedly connected thereto, said segment and blank being arranged on the same side of the cone center of the blank, a second bevel gear segment having a pitch angle less than ninety degrees, and means for rolling the first mentioned segment on the latter segment.

18. A bevel gear generating machine comprising a reciprocating tool, a bevel gear segment having a pitch angle less than that of the blank to be cut and fixedly connected thereto, said segment and blank being arranged on the same side of the cone center of the blank, a second bevel gear segment which is stationary and has a pitch angle less than ninety degrees, and means for rolling the first mentioned segment on the latter segment.

19. A bevel gear generating machine comprising a pair of reciprocating planing tools, and means for rolling a gear blank over the tools during the cutting action, said means including a bevel gear segment fixedly connected to the blank and rolling upon a stationary bevel gear segment, having a pitch angle other than 90° the blank and first mentioned bevel gear segment being arranged on the same side of the cone center of the blank.

20. A bevel gear generating machine comprising a pair of reciprocating tools, and means for rolling a gear blank over the tools during the cutting action, said means including an oscillatory carrier, a blank support eccentrically mounted on the carrier, a bevel gear segment fixedly connected to the blank support, and a second bevel gear segment upon which the first mentioned segment rolls.

21. A bevel gear generating machine comprising a gear blank support, an oscillatory carrier on which the blank support is eccentrically mounted, tool mechanism, and tool feeding mechanism comprising a support for the tool mechanism movable toward and from the gear blank in a direction parallel to the axis about which said carrier oscillates.

22. A bevel gear generating machine comprising a gear blank support, an oscillatory carrier on which the blank support is eccentrically mounted, a bed, guideways on the bed, tool mechanism, and tool feeding mechanism comprising a support for the tool mechanism movable in said guideways in a direction parallel to the axis about which said carrier oscillates.

23. A bevel gear generating machine comprising a gear blank support, an oscillatory carrier in which the blank support is eccentrically mounted, a gear segment fixedly connected to the blank support, a gear member on which said segment rolls, tool mechanism, and tool feeding mechanism comprising a support for the tool mechanism movable toward and from the blank in a direction parallel to the axis about which said carrier oscillates.

24. A bevel gear generating machine comprising a gear blank support, an oscillatory carrier on which the blank support is eccentrically mounted, a gear segment fixedly connected to the blank support, a gear member on which said segment rolls, a bed, guideways on the bed, tool mechanism, and tool feeding mechanism comprising a support for the tool mechanism movable in said guideways in a direction parallel to the axis about which said carrier oscillates.

25. A gear cutting machine comprising a gear blank support, tool mechanism including a rotary spindle, an oscillatory actuating plate, a link directly connecting said plate and spindle, and a tool slide pivotally connected to said actuating plate and reciprocated thereby.

26. A gear cutting machine comprising a gear blank support, tool mechanism including a rotary spindle, an oscillatory actuating plate, a link directly connecting said plate and spindle, said actuating plate having a slot therein, a block movable in said slot, and a tool slide connected to said block.

27. A gear cutting machine comprising a gear blank support, tool mechanism including a rotary spindle, an oscillatory actuating plate, a link directly connecting said plate and spindle, a bearing, an arbor arranged centrally of said actuating plate and mounted in said bearing, and a reciprocating tool slide pivotally connected to the actuating plate.

28. A gear cutting machine comprising a gear blank support, tool mechanism including a rotary spindle, an oscillatory actuating plate, a link directly connecting said plate and spindle, a bearing, an arbor arranged centrally of the actuating plate and mounted in said bearing, said actuating plate having a slot extending centrally thereacross, a block slidable in the slot, and a reciprocating tool slide connected to said block.

29. A gear cutting machine comprising a gear blank support, tool mechanism including a rotary spindle, an oscillatory actuating plate connected to said spindle and operated thereby, and a pair of reciprocating tool slides connected at opposite points in said actuating plate.

30. A gear cutting machine comprising a gear blank support, tool mechanism including a rotary spindle, an oscillatory actuating plate connected to said spindle and operated thereby, said actuating plate having a slot extending centrally thereacross, a pair of blocks slidable in said slot at opposite points on the actuating plate, and a pair of reciprocating tool slides connected to said blocks.

31. A gear cutting machine comprising a gear blank support, tool mechanism including a rotary spindle, an oscillatory actuating plate, a crank on the spindle, a crank arm connecting the actuating plate and the spindle, a bearing, an arbor on said actuating plate and mounted in said bearing, the actuating plate having a slot extending centrally thereacross, a pair of blocks slidable in said slot at opposite points thereof, and a pair of reciprocating tool slides connected to said blocks.

32. A gear cutting machine comprising a continuously rotating power member, a tool operating spindle arranged concentrically of the power member, a cam shaft, a transmission pulley arranged concentrically of said power member and adapted to drive said cam shaft, and friction clutch mechanism for simultaneously engaging said tool operating spindle and said transmission pulley with the power member.

33. A gear cutting machine comprising a continuously rotating power member, a tool operating spindle arranged concentrically of the power member, a cam shaft, a transmission pulley also arranged concentrically of the power member for driving the cam shaft, and friction clutch mechanism operated by moving said transmission pulley longitudinally of the tool operating spindle and acting to engage or disengage the transmission pulley and tool operating spindle with the power member.

34. A gear cutting machine comprising a continuously rotating power member, a tool operating spindle arranged concentrically of the power member, a transmission pulley arranged concentrically of the power member, friction clutch mechanism interposed between the power member and the tool operating spindle and transmission pulley, and means acting automatically when a predetermined number of teeth are completed to operate the clutch and disengage the tool operating spindle and transmission pulley from the power member.

35. A gear cutting machine comprising a continuously rotating power member, a tool operating spindle arranged concentrically thereof, a transmission pulley arranged concentrically of the power member and slidable longitudinally of said spindle, friction clutch mechanism interposed between the power member and the tool operating spindle and transmission pulley, and means acting automatically when a predetermined number of teeth are completed to operate the clutch by sliding the transmission pulley longitudinally and thereby disengage the transmission pulley and tool operating spindle from the power member.

36. In a gear cutting machine, the combination with a continuously rotating power member, of a clutch for engaging said power member with the driven parts of the machine, a spring-controlled plunger connected to said clutch and operating normally to release it, a locking member cooperating with said plunger and acting to hold it in retracted position with the clutch engaged, and automatic means for releasing said locking member when a predetermined number of teeth have been cut.

37. In a gear cutting machine, the combination with a gear blank support, an oscillatory carrier on which the blank support is eccentrically mounted, a tool mechanism support movable toward and from the blank, and a cam shaft having a pair of cams mounted thereon, one operatively connected to said oscillatory carrier and the other operatively connected to said tool mechanism support.

38. In a gear cutting machine, the combination with a gear blank support, an oscillatory carrier on which the blank support is eccentrically mounted, a gear segment fixedly connected to the blank support, a second gear member on which said gear segment rolls, a tool mechanism support movable toward and from the blank in a direction parallel to the oscillatory axis of said carrier, and a rotary cam shaft having a pair of cams thereon, one operatively connected to said oscillatory carrier and the other operatively connected to said tool mechanism support.

39. In a gear generating machine, the combination with a tool mechanism support and a blank support, of an oscillating carrier acting to impart a generating motion to the blank support, a controlling cam, a lever pivoted on one side of said cam and having its free end on the opposite side of the cam connected to said carrier, and a pin located beween the ends of the lever and cooperating with the cam.

40. In a gear generating machine, the combination with tool mechanism, of an oscillatory carrier including an upper guiding portion movable in vertically arranged curved guideways, and a substantially horizontal bed arranged beneath the guiding portion on which a gear blank support may be adjustably mounted, said bed being fixed to and movable with said guiding portion.

41. The method of generating a bevel gear which consists in securing a relative motion between the blank and a reciprocating planing tool as of the pitch cone of the blank rolling on a plane surface, by means of a pair of relatively rolling bevel gear segments, the blank being adjusted with its root line parallel to the center line of the machine and reciprocating the planing tool during such rolling motion, along such center line.

42. The method of generating a bevel gear which consists in rolling the pitch cone of the blank on an imaginary plane surface with reference to a reciprocating planing tool by means of a bevel gear segment fixedly connected to the blank and rolling on a second bevel gear segment, the blank being adjusted with its root line parallel to the center line of the machine, and reciprocating the planing tool during such rolling motion of the blank, along such center line.

43. The method of generating a bevel gear which consists in adjusting the root line of the tooth parallel to the line of travel of a reciprocating planing tool, effecting a rolling action of the blank as of its pitch cone surface rolling upon a plane, by means of a bevel gear segment fixedly connected to the blank and rolling upon a stationary bevel gear segment having a pitch angle other than 90°, and reciprocating the planing tool during such rolling motion of the blank.

44. A bevel gear generating machine comprising a reciprocating planing tool, a bevel gear segment fixedly connected to the gear blank, and a stationary bevel gear segment having a pitch angle other than 90° upon which the first mentioned segment rolls whereby to effect rolling motion of the blank relatively to the planing tool as of its pitch cone surface on a plane.

45. A bevel gear generating machine comprising a reciprocating planing tool, means permitting adjusting a gear blank with the root line of a tooth parallel to the line of travel of the tool, and means for effecting a rolling motion of the blank comprising a bevel gear segment fixedly connected with the blank and rolling upon a stationary bevel gear member, having a pitch angle other than 90°.

In witness whereof, we have hereunto signed our names.

JAMES E. GLEASON.
GEORGE H. BRYAN.
EYVIND FINSEN.
ALTON P. SLADE.